(12) United States Patent
White

(10) Patent No.: US 6,542,986 B1
(45) Date of Patent: Apr. 1, 2003

(54) RESOLVING DEPENDENCIES AMONG CONCURRENTLY DISPATCHED INSTRUCTIONS IN A SUPERSCALAR MICROPROCESSOR

(75) Inventor: Scott A. White, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/437,086

(22) Filed: Nov. 9, 1999

(51) Int. Cl.[7] ................................. G06F 9/38
(52) U.S. Cl. ........................... 712/217; 712/23
(58) Field of Search ................... 712/23, 216, 217

(56) References Cited

U.S. PATENT DOCUMENTS

| 5,651,125 | A | | 7/1997 | Witt et al. ............ 712/218 |
| 5,872,951 | A | | 2/1999 | Tran ..................... 712/218 |
| 5,878,244 | A | | 3/1999 | Witt et al. ............ 712/218 |
| 5,961,634 | A | * | 10/1999 | Tran ..................... 712/215 |
| 6,108,769 | A | * | 8/2000 | Chinnakonda et al. ... 712/216 |
| 6,134,651 | A | * | 10/2000 | Witt et al. ............. 712/212 |

* cited by examiner

Primary Examiner—Eric Coleman
(74) Attorney, Agent, or Firm—Lawrence J. Merkel; Meyertons, Hood, Kivlin, Kowert & Goetzel, P.C.

(57) ABSTRACT

A superscalar processor may issue multiple instructions per clock cycle. Included in a superscalar processor may be a reorder buffer which stores information corresponding to concurrently dispatched instructions. Dependencies may exist among the instructions which are concurrently dispatched. To resolve this dependency, when a dependency is detected amongst a group of concurrently dispatched instructions, an indication of the dependency, along with an indication of the position of the dependency, is conveyed to the corresponding reservation station. When the reservation station receives the indication of the dependency, the operand tag associated with the dependency may be replaced with the correct tag. Advantageously, the circuitry needed to resolve the dependency may be moved out of the critical path of the processor; thus, improving the performance of the processor by allowing it to operate at an increased frequency.

24 Claims, 5 Drawing Sheets

|  | Position 0<br>520 | Position 1<br>522 | Position 2<br>524 |
|---|---|---|---|
| Line 2<br>518 | Instruction 0 | Instruction 1 | Instruction 2 |
| Line 1<br>516 | ADD R2, R1<br>502 | ADD R1, R8<br>504 | ADD R3, R1<br>506 |
| Line 0<br>514 | ADD R1, R6<br>508 | ADD R4, R5<br>510 | ADD R6, R8<br>512 |

Instruction Information
Storage
800

Fig. 3

RESOLVING DEPENDENCIES AMONG CONCURRENTLY DISPATCHED INSTRUCTIONS IN A SUPERSCALAR MICROPROCESSOR

BACKGROUND OF THE INVENTION

1. Field of the Invention

This invention is related to the field of superscalar microprocessors and, more particularly, to handling data dependencies between concurrently dispatched instructions.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to increase performance, superscalar microprocessors often employ out of order execution. The instructions within a program are ordered, such that a first instruction is intended to be executed before a second instruction, etc. One hazard of out of order execution is ensuring the intended functionality of the program is not altered. When the instructions are executed in the order specified, the intended functionality of the program is realized. However, instructions may be executed in any order as long as the original functionality is maintained. For example, a second instruction which does not depend upon a first instruction may be executed prior to the first instruction, even if the first instruction is prior to the second instruction in program order. A second instruction depends upon a first instruction if a result produced by the first instruction is employed as an operand of the second instruction. The second instruction is said to have a dependency upon the first instruction.

As used herein, a source operand of an instruction is a value to be operated upon by the instruction in order to produce a result. Conversely, a destination operand is the result of the instruction. Source and destination operands of an instruction are generally referred to as operand information. An instruction specifies the location storing the source operands and the location in which to store the destination operand. An operand may be stored in a register (a "register operand") or a memory location (a "memory operand"). As used herein, a register is a storage location included within the microprocessor which is used to store instruction results. Registers may be specified as source or destination storage locations for an instruction.

Another hazard that arises in superscalar processors is due to the intra-line dependencies that may exist among concurrently dispatched instructions in the multiple dispatch model of instruction processing. The multiple dispatch model refers to the ability to dispatch multiple instructions for execution simultaneously. This is in contrast to the single dispatch model, wherein a single instruction is dispatched for execution at one time. When multiple instructions are dispatched simultaneously, it is possible for one of the simultaneously dispatched instructions to have a dependency on another one of the simultaneously dispatched instructions. This dependency arises when the source of a later instruction in program order is also the destination of an earlier instruction in program order. Because instructions may be executed out of order, incorrect results may be obtained if intra-line dependencies are not detected and resolved. One possible solution is to detect and resolve intra-line dependencies within the reorder buffer prior to dispatching the instructions to the reservation stations. However, the added circuitry involved in resolving the intra-line dependency within the reorder buffer, which may be in the "critical path" of the microprocessor, may result in a frequency limitation of the microprocessor. As used herein, "critical path" refers to those portions of the microprocessor which must be executed in the ordinary operation of the microprocessor and whose delay places a limitation on the operating frequency of the microprocessor. Consequently, increasing the delay associated with the critical path of the processor may adversely impact its performance.

SUMMARY OF THE INVENTION

The problems outlined above are in large part solved by a microprocessor and method as described herein. When an intra-line dependency is detected amongst a group of simultaneously dispatched instructions, an indication of the dependency, along with an indication of the position within the group of the instruction upon which the dependency is detected, is conveyed to the corresponding reservation station. When the reservation station receives the indication, the operand tag associated with the dependency may be overwritten with the correct tag. Advantageously, the circuitry used to resolve the dependency may be moved out of the critical path of the processor; thus, improving the performance of the microprocessor by allowing it to be operated at an increased frequency.

Broadly speaking, a microprocessor is contemplated comprising a plurality of decode units, a reorder buffer, and a plurality of reservation stations. The decode units are configured to concurrently decode instructions and are configured to convey operand request information. The reorder buffer is configured to receive operand request information and convey operand information responsive to a dependency check on instructions prior in program order to the concurrently decoded instructions. The reorder buffer is further configured to detect and convey an indication of a dependency of a second instruction of concurrently received instructions on a first instruction of concurrently received instructions, where the second instruction is subsequent to the first instruction in program order. Finally, the reservation stations are coupled to receive and store operand information and the above mentioned indication. In addition, the reservation stations are configured to update the stored operand information with a tag of the above mentioned first instruction, in response to detecting the indication of a dependency.

Further, a method is contemplated. A plurality of instructions are concurrently decoded and operand request information is obtained from the decoded instructions. A dependency of a second instruction of the plurality of instructions on a first instruction of the plurality of instructions is detected, where the second instruction is subsequent to the first instruction in program order. Operand information corresponding to instructions prior to the plurality of instructions is stored for the second instruction in a reservation station. The stored operand information is updated with a tag of the first instruction in response to detecting the above dependency.

Still further contemplated is a microprocessor comprising a reorder buffer and a reservation station. The reorder buffer is coupled to concurrently receive an indication of a first instruction and a second instruction which is subsequent to the first instruction in program order. The reorder buffer is configured to output operand information for the second instruction in response to dependency checking the second instruction against instructions prior in program order to the first instruction. In addition, the reorder buffer is configured to output a dependency indication responsive to detecting a dependency of the second instruction on the first instruction. The reservation station is coupled to receive operand information and the dependency indication. The reservation is further configured to store the operand information and subsequently update it with a tag of the first instruction in response to the dependency indication.

BRIEF DESCRIPTION OF THE DRAWINGS

Other objects and advantages of the invention will become apparent upon reading the following detailed description and upon reference to the accompanying drawings in which:

FIG. 3 shows one embodiment of the instruction information storage in the reorder buffer shown in FIG. 1.

Figure 1:
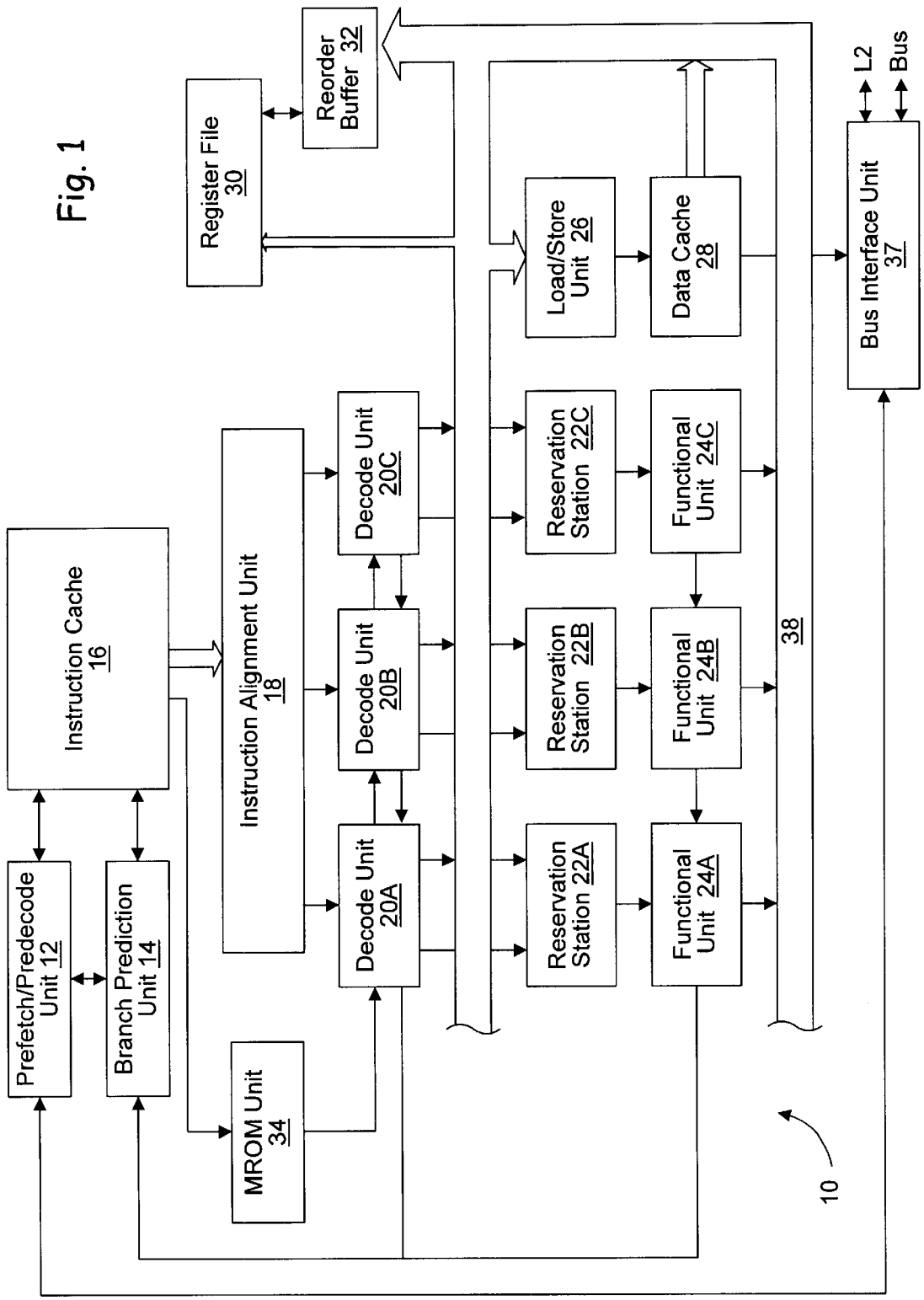
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. In one embodiment, reorder buffer 32 includes a future file which receives operand requests from decode units as well. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are issued by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10, including using a future file to store the speculative state of register file 30.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Intra-line Dependency Checking

Figure 2:
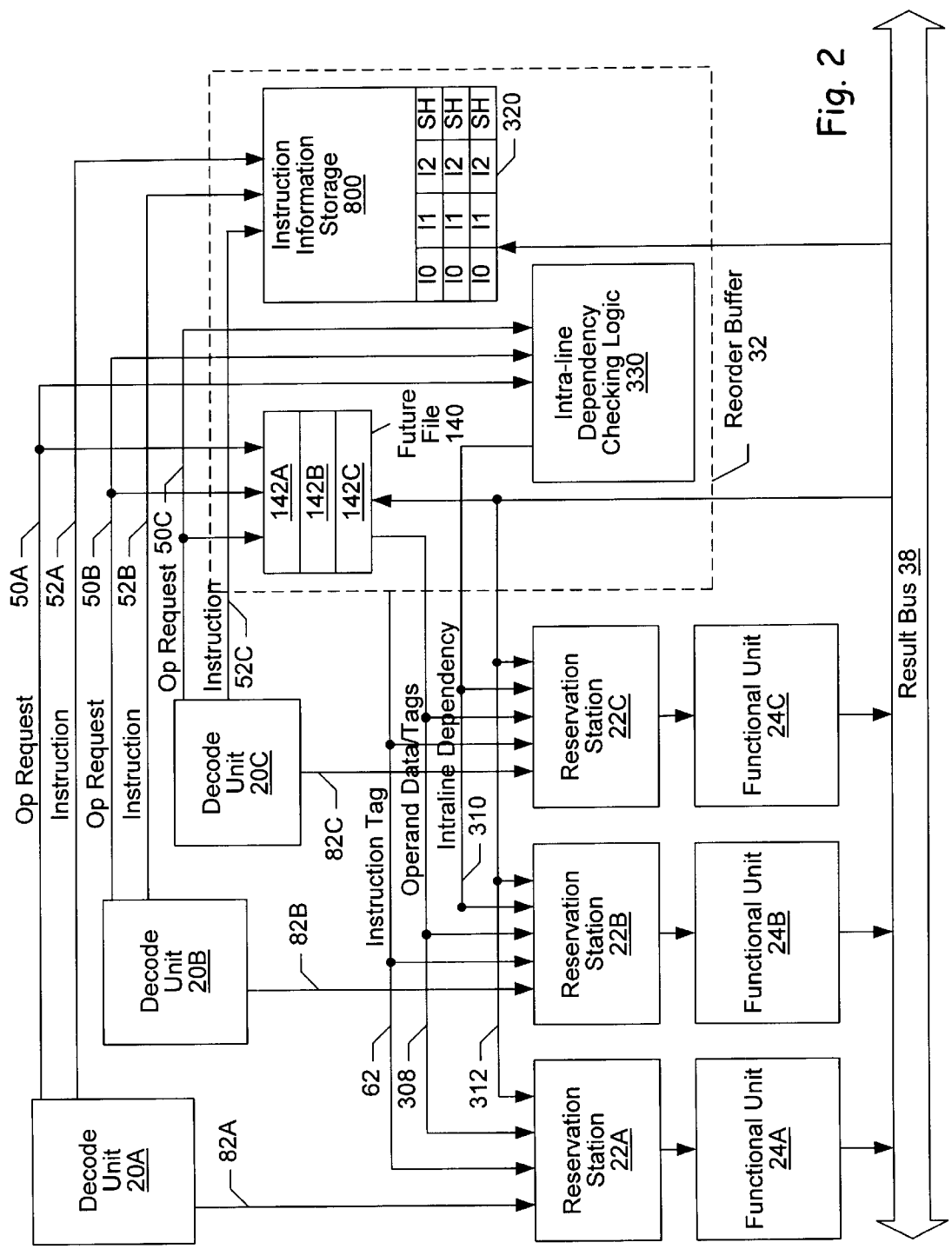
FIG. 2 is a diagram showing the interconnection between decode units 20A–20C, reservation stations 22A–22C, functional units 24A–24C, future file 140 and reorder buffer 32.

Turning now to FIG. 2, a block diagram of decode units 20A–20C, reservation stations 22A–22C, functional units 24A–24C, instruction information storage 800, intra-line dependency checking logic 330, and future file 140 are shown. Interconnection between the units is shown according to one embodiment of microprocessor 10. Other embodiments are contemplated and may not include future file 140 and may employ other interconnection, and additional interconnection may be employed for other purposes.

Decode units 20A–20C decode instructions and convey operand requests to future file 140 and intra-line dependency checking logic 330 on buses 50A–50C respectively. As discussed above, superscalar processors may issue more than one instruction at a time. Consequently, multiple decode units 20A–20C may decode and issue instructions simultaneously. In addition, decode units 20A–20C convey instruction information to instruction information storage 800 on buses 52A–52C and convey decoded instruction information to reservation stations 22A–22C on buses 82A–82C. Future file 140 stores instruction information storage tags and/or instruction results for each register employed within register file 30. In other words, future file 140 includes a plurality of storage locations. One storage location 142 is assigned to each register. The storage location 142 for a particular register stores the instruction information storage tag of the instruction which is last (in program order) within instruction information storage 800 to update the register. An instruction having the register as a source operand receives the reorder buffer tag by accessing the corresponding storage location 142. When the corresponding instruction result is provided via execution of the instruction, the instruction result is stored into the storage location 142. Subsequently, the instruction result is provided instead of the reorder buffer tag. Tag validity information may be used to indicate if a tag or data is conveyed for a given operand upon operand data/tag bus 308.

Also illustrated in FIG. 2 is the storage of instruction information by reorder buffer 32. Instruction information storage 800 may comprise lines of storage 320 where each line is configured to store information pertaining to up to three simultaneously issued instructions, I0–I2. In addition, instruction information storage may store shared information, SH, which is associated with the line of storage. When instructions are issued from decode units 20A–20C, instruction information is conveyed to instruction information storage 800 and operand requests for the instructions are conveyed to future file 140 and intra-line dependency checking logic 330. If an instruction already within instruction information storage 800 has a destination which corresponds to a received source operand request, future file 140 conveys the tag of the prior instruction, or the result of the prior instruction execution if the prior instruction has already been executed, to reservation stations 22 upon operand data/tag bus 308. If intra-line dependency checking logic 330 detects another instruction within the same dispatch line has a destination operand which is the same as the requested source operand and the other instruction is prior in program order to the instruction requesting the source operand, intra-line dependency checking logic 330 conveys an indication upon bus 310 that an intra-line dependency exists and the position within the dispatch line of the dependency. Further, reorder buffer 32 conveys the instruction tag to reservation stations 24 upon bus 62, as will be further discussed below.

In another embodiment, microprocessor 10 may not include a future file. If a future file is not included, reorder buffer 32 may include circuitry to detect data dependencies among instructions. In one embodiment, reorder buffer 32 includes comparator circuitry to detect dependencies among source operands of concurrently dispatched instructions and destination operands of instructions prior in program order to the concurrently dispatched instructions. In some cases, there may be multiple instructions within reorder buffer 32 which have the required operand as a destination. Reorder buffer 32 includes circuitry to identify which instruction within the reorder buffer is the last in program order to update the destination register. If the instruction has executed and has provided an instruction result, that result is conveyed upon operand data/tag bus 308. If the instruction has not yet executed, the reorder buffer tag locating the instruction within reorder buffer 32 is conveyed upon operand data/tag bus 308. One operand data value and one operand tag are provided for each operand of the instruction upon operand data/tag bus 308. As above, validity indicators may be asserted for each data and tag value by reorder buffer 32, such that reservation stations 22 may discern which is being provided for a particular operand (e.g. data or reorder buffer tag). Intra-line dependency checking logic 330 provides an indication of intra-line dependencies upon bus 310 as discussed above.

To illustrate intra-line dependencies, FIG. 3 shows a diagram illustrating one embodiment of instruction information storage 800. Shown are lines of storage, 514–518, each containing information corresponding to 3 instructions. Line 0 514 contains information for instructions 508, 510 and 512 and line 1 516 contains information for instructions 502, 504 and 506. Each line comprises 3 instruction information positions 520, 522 and 524. Line 0 514 contains information for instructions which occur prior in program order to those in line 1 516. Further, position 0 520 contains instruction information which is prior to position 1 522 and position 2 524 in program order. Position 1 522 contains information related to instructions which are prior to position 2 in program order.

In the single dispatch model, only one instruction is dispatched at one time. Instructions typically first obtain the tag or data for its source operands and then write its tag for its destination. Following this sequence, subsequent instructions which use the written tag as source operand data will be assured of receiving the correct source operand data, according to the program order of instructions. However, in the multiple dispatch model, data dependencies may prevent some instructions from receiving the correct data for source operands. For example, line 0 514 and line 1 516 represent lines of dispatched instructions in a multiple dispatch model. Assume the program order of instructions is 508, 510, 512, 502, 504 and 506. When line 0 514 is dispatched, each instruction represented 508, 510 and 512 obtains the tag or data for its source operand and writes its tag for its destination. Therefore, storage for register R1 contains the tag for instruction 508, storage for register R4 contains the tag for instruction 510 and storage for register R6 contains the tag for instruction 512. When line 1 is dispatched, the same sequence of events occurs. Each instruction obtains the tag or data for its source operands, then writes its tag to the storage location for the destination. Instructions 502 and 506 obtain the tag for instruction 508 for their source operand R1. However, because instruction 504 has a destination of register R1 and occurs prior to instruction 506 which has a source of register R1, instruction 506 requires the tag for instruction 504 for its source operand R1, rather than the tag for instruction 508. Consequently, incorrect results may be produced by instruction 506. Resolution of this intra-line dependency is needed to ensure the correct execution of instructions. As discussed above, the tag for instruction 508 is conveyed to reservations station 22C as the register R1 source operand for instruction 506. However, also conveyed is an indication that the tag is invalid, as well as an indication of an intra-line dependency via intra-line dependency bus 310. Further, the position of instruction 504, which represents the instruction upon which instruction 506 depends, is conveyed to reservation station 22C as well. Resolution of the intra-line dependency occurs within the reservation station 22 as discussed below.

Figure 4:
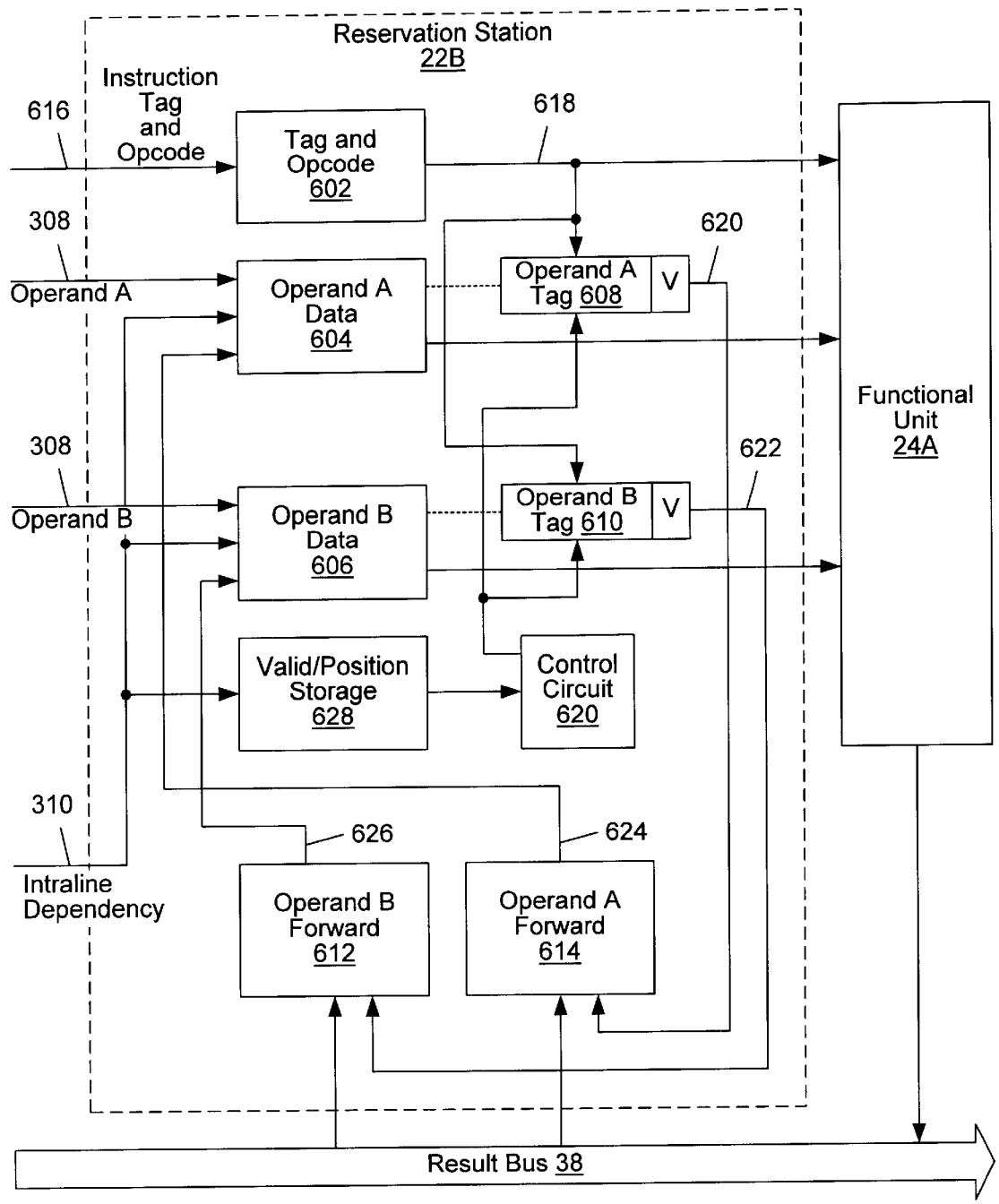
FIG. 4 is a diagram of a reservation station shown in FIG. 1, according to one embodiment of the microprocessor.

FIG. 4 shows one embodiment of a reservation station 22B. Reservation station 22B includes storage for an instruction tag and opcode 602, source operand data 604 and 606, source operand tags and valid indicators 608 and 610, control circuit 620, dependency valid/position storage 628, and circuitry for detecting and capturing forwarded results from other executed instructions 612 and 614. As discussed above, when instructions are dispatched, source operand data or tags are conveyed to reservation stations 22. If source operand tags are conveyed upon bus 308, the tag is stored in operand tag storage location 608 or 610, depending on whether it is a tag for source operand A or source operand B. If a tag is indicated as being provided or an intra-line dependency is indicated on bus 310, the tag valid indicator 608 or 610 is set, indicating the tag stored therein is valid. On the other hand, if data is indicated as being provided and no intra-line dependency is indicated on bus 310, the tag valid bit is cleared. Valid source operand tags stored in locations 608 and 610 are conveyed to operand forward circuitry 612 and 614 upon buses 622 and 620, respectively. Operand forward circuitry 612 and 614 monitors result bus 38 for a tag which matches the valid source operand tag stored at operand tag storage 608 or 610 respectively. When operand forward circuitry detects a match, the data associated with the tag on result bus 38 is captured and conveyed to operand data storage 604 or 606. Additionally, the tag valid bit is cleared upon capturing the corresponding operand data. When all source operands have been received by reservation station 22B the instruction is eligible for execution.

In some cases, when reservation station 22B receives source operand tags or data, also received will be an indication that the tag or data is invalid upon intra-line dependency bus 310. An indication that an intra-line dependency exists may be received upon bus 310 along with the position within the dispatch line of the dependency. Both the intra-line dependency and position may be stored in valid/position storage 628. When reservation station 22B receives this indication, valid/position storage 628 conveys the indication and position to control circuit 620. Control circuit 620 then causes the portion of the instruction tag stored at 602, which represents the reorder buffer dispatch line, to be written into the source operand tag storage location with the dependency, 608 or 610. Also, the position of the intra-line dependency within the dispatch line received on bus 310 is written into the operand tag storage location 608 or 610. Any tag currently within the operand tag storage location, 608 or 610, is overwritten. Control circuit 620 then marks the newly assembled operand tag stored in tag storage location 608 or 610 as valid. In this way, a new source operand tag is assembled which identifies the location in reorder buffer 32 storing the instruction which will produce the result needed by the dependent source operand. With the newly assembled source operand tag, operand forward logic 612 and 614 may capture the correct operand data for the dependent source operand.

Because the intra-line dependency exists within the same dispatch line, the instruction tag representing the instruction dispatched to reservation station 22B may be used as it is the same dispatch line as the instruction upon which it depends. Advantageously, there is no need to convey the dispatch line tag when an intra-line dependency is detected. Further, because the dependency is within the same dispatch line, the corrective action taken with respect to the source operand tag may be done on the cycle following dispatch with no concern that results may be ready before the correct tag is assembled. Still further, resolution of the intra-line dependency is removed from future file 140 and reorder buffer 32, simplifying the logic therein and removing the resolution from the critical path. To resolve the dependency within the critical path, i.e., future file 140 or reorder buffer 32, may result in limiting the operating frequency and performance of the microprocessor.

It is noted that, while the above description refers to the A and B operands of the instruction (e.g. the general register operands), the handling of intraline dependencies for flag operands may also be performed in the same manner described above. Thus, an operand for a particular instruction may be a register operand or a flag operand and the reservation station may receive: (i) operand information (e.g. tags or data) corresponding to that operand for the particular instruction responsive to a dependency check on prior instructions; and (ii) an intraline dependency indication if the particular instruction is dependent on a concurrently dispatched instruction for that operand.

It is noted that other embodiments of reorder buffer 32 may not employ the line oriented structure described above. Instead, individual storage locations may be allocated to each instruction, with tags assigned in numerically increasing order. If a dependency is detected among concurrently dispatched instructions, the relative position of the dependency may be subtracted from the instruction tag to generate the tag of the dependency.

Figure 5:
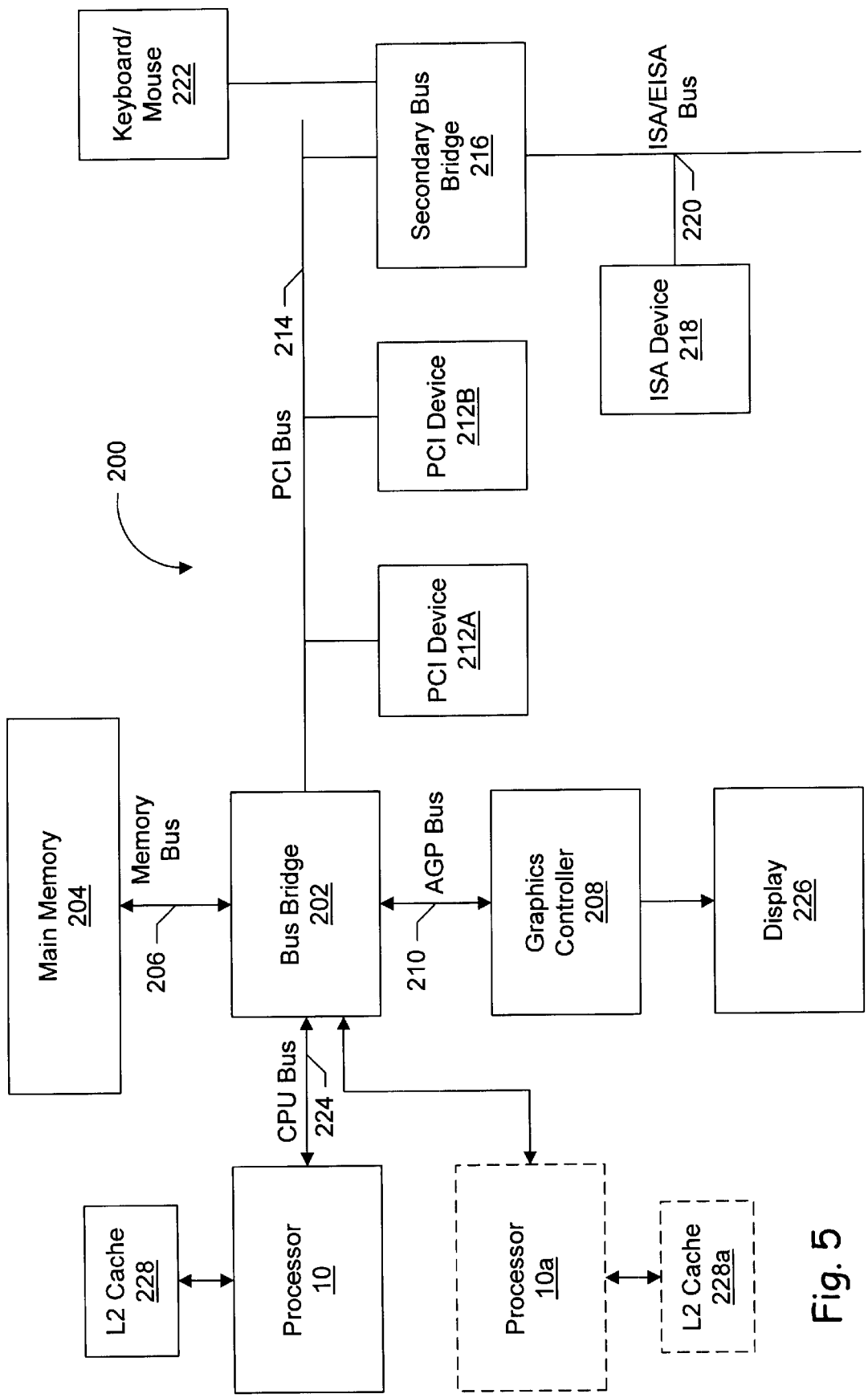
FIG. 5 is a block diagram of one embodiment of a computer system including the microprocessor shown in FIG. 1.

Turning now to FIG. 5, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 5) or may share CPU bus 224 with processor 10. Furthermore, processor 10*a* may be coupled to an optional L2 cache 228*a* similar to L2 cache 228.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a plurality of decode units configured to concurrently decode a plurality of instructions, wherein said decode units are configured to convey operand request information; and
   a reorder buffer coupled to receive said operand request information, wherein said reorder buffer is configured to convey operand information responsive to a dependency check on instructions prior in program order to said plurality of instructions, wherein said reorder buffer is configured to detect a dependency of a second instruction of said plurality of instructions on a first instruction of said plurality of instructions for a first operand of said second instruction, and wherein said operand information includes first operand information corresponding to said first operand, and wherein said second instruction is subsequent to said first instruction in program order, wherein said reorder buffer is configured to convey an indication of said dependency on said first instruction; and a plurality of reservation stations coupled to receive said operand information and said indication of said dependency, wherein said plurality of reservation stations are configured to store said operand information, and wherein a first one of said plurality of reservation stations corresponding to said second instruction is configured to store said first operand information and said indication of said dependency and is further configured, responsive to said indication of said dependency, to update said first operand information with a tag of said first instruction.

2. The microprocessor of claim 1, wherein said reorder buffer comprises a plurality of lines of storage, wherein said reorder buffer is configured to store information for concurrently received instructions within a line of storage, and wherein said information for said first instruction and said information for said second instruction are both stored within the same said line of storage, and wherein said plurality of reservation stations are coupled to receive a line tag identifying said line of storage in said reorder buffer, and wherein said dependency indication includes a position of said first instruction within said line of storage, wherein said tag of said first instruction is assembled by concatenating said line tag with said position.

3. The microprocessor of claim 1, wherein said reorder buffer comprises:

storage for said instruction information, and a future file, wherein said future file is configured to store an instruction tag of a first instruction if said first instruction has information stored in said storage and said first instruction has not been executed, and wherein said future file is configured to store a result of execution of a second instruction if said second instruction has information stored in said storage and said second instruction has been executed, and wherein said dependency check is performed by reading said future file.

4. The microprocessor of claim 1, wherein said operand information comprises data representative of the contents of a register in a register file if a first condition exists, and wherein said operand information comprises a tag representative of a storage location within said reorder buffer if a second condition exists, and wherein said operand information comprises a result of execution of an instruction which is within said reorder buffer if a third condition exists.

5. The microprocessor of claim 4, wherein said first condition is a lack of detection of said dependency on said instructions prior to said plurality of instructions.

6. The microprocessor of claim 5, wherein said second condition is the detection of a first instruction within said reorder buffer which is prior in program order to said plurality of instructions, and wherein said first instruction has a destination register which is the same as the source register for said operand information for a second instruction, wherein said second instruction is within said plurality of instructions, and wherein said first instruction is the last instruction in program order within said reorder buffer which has the same said destination register as said source register, and wherein said first instruction has not yet been executed.

7. The microprocessor of claim 5, wherein said third condition is the detection of a first instruction within said reorder buffer which is prior in program order to said plurality of instructions, wherein said first instruction has a destination register which is the same as the source register for said operand information for a second instruction, wherein said second instruction is within said plurality of instructions, and wherein said first instruction is the last instruction in program order within said reorder buffer which has the same said destination register as said source register, and wherein said results of said execution are stored within said reorder buffer.

8. A method comprising:

concurrently decoding a plurality of instructions, said decoding including obtaining operand request information from said plurality of instructions;

detecting a dependency of a second instruction of said plurality of instructions on a first instruction of said plurality of instructions for a first operand of said second instruction, wherein said second instruction is subsequent to said first instruction in program order;

storing operand information corresponding to instructions prior to said plurality of instructions in a reservation station, said operand information for said second instruction and including first operand information corresponding to said first operand;

replacing said first operand information in said reservation station with a tag of said first instruction, responsive to said detecting.

9. The method of claim 8, further comprising:

performing a dependency check of said plurality of instructions on instructions prior to said plurality of instructions;

generating said operand information in response to said dependency check, wherein said operand information comprises data representative of the contents of a register in a register file if a first condition exists, and wherein said operand information comprises a tag representative of a storage location within said reorder buffer if a second condition exists, and wherein said operand information comprises a result of execution of an instruction which is within said reorder buffer if a third condition exists.

10. The method of claim 9, wherein said first condition is the detection that a source register for said operand information of a second instruction is not also a destination register for a first instruction within said reorder buffer, wherein said first instruction is prior in program order to said plurality of instructions, and wherein said second instruction is within said plurality of instructions.

11. The method of claim 10, wherein said second condition is the detection of a first instruction within said reorder buffer which is prior in program order to said plurality of instructions and has a destination register which is the same as the source register for said operand information for a second instruction, wherein said second instruction is within said plurality of instructions, and wherein said first instruction is the last instruction in program order within said reorder buffer which has a same said destination register as said source register, and wherein said first instruction has not yet been executed.

12. The method of claim 10, wherein said third condition is the detection of a first instruction within said reorder buffer which is prior in program order to said plurality of instructions and has a destination register which is the same as the source register for said operand information for a second instruction, wherein said second instruction is within said plurality of instructions, and wherein said first instruction is the last instruction in program order within said reorder buffer which has a same said destination register as said source register, and wherein said first instruction has been executed and produced results, and wherein said results are stored within said reorder buffer.

13. The method of claim 9, wherein said dependency check comprises accessing a register in a future file corresponding to a source register of an instruction which is within said plurality of instructions.

14. A microprocessor comprising:

a reorder buffer coupled to concurrently receive an indication of a first instruction and a second instruction which is subsequent to said first instruction in program order, wherein said reorder buffer is configured to output operand information for said second instruction in response to dependency checking said second instruction against instructions prior in program order to said first instruction, and wherein said reorder buffer is configured to output a dependency indication responsive to detecting a dependency of said second instruction on said first instruction; and a reservation station coupled to receive said operand information and said dependency indication, wherein said reservation station is configured to store said operand information and is further configured to subsequently update said operand information with a first tag of said first instruction responsive to said dependency indication.

15. The microprocessor of claim 14, wherein said reorder buffer comprises a plurality of lines of storage, wherein said reorder buffer is configured to store information for concurrently received instructions within a line of storage, and wherein said information for said first instruction and said information for said second instruction are both within the same said line of storage, and wherein said plurality of reservation stations are coupled to receive a line tag identifying said line of storage in said reorder buffer, and wherein said dependency indication includes a position of said first instruction within said line of storage, wherein said tag of said first instruction is assembled by combining said line tag with said position.

16. The microprocessor of claim 14, wherein said operand information comprises data representative of the contents of a register in a register file if a first condition exists, and wherein said operand information comprises a tag representative of a storage location within said reorder buffer if a second condition exists, and wherein said operand information comprises a result of execution of an instruction which is within said reorder buffer if a third condition exists.

17. The microprocessor of claim 14, wherein said first condition is a lack of detection of said dependency on said instructions prior to said plurality of instructions.

18. The microprocessor of claim 14, wherein said second condition is the detection of a first instruction within said reorder buffer which is prior in program order to said plurality of instructions, and wherein said first instruction has a destination register which is the same as the source register for said operand information for a second instruction, wherein said second instruction is within said plurality of instructions, and wherein said first instruction is the last instruction in program order within said reorder buffer which has the same said destination register as said source register, and wherein said first instruction has not yet been executed.

19. The microprocessor of claim 14, wherein said third condition is the detection of a first instruction within said reorder buffer which is prior in program order to said plurality of instructions, wherein said first instruction has a destination register which is the same as the source register for said operand information for a second instruction, wherein said second instruction is within said plurality of instructions, and wherein said first instruction is the last instruction in program order within said reorder buffer which has the same said destination register as said source register, and wherein said results of said execution are stored within said reorder buffer.

20. The microprocessor of claim 14, wherein said reorder buffer comprises:

storage for said instruction information, and a future file, wherein said future file is configured to store an instruction tag of a first instruction if said first instruction has information stored in said storage and said first instruction has not been executed, and wherein said future file is configured to store a result of execution of a second instruction if said second instruction has information stored in said storage and said second instruction has been executed, and wherein said dependency check is performed by reading said future file.

21. A processor comprising:

a first circuit coupled to receive operand requests corresponding to a first instruction and a second instruction that is concurrently dispatched with the first instruction, wherein the first circuit is configured to output operand information corresponding to the operand requests, the operand information representing operation of a plurality of instructions prior to the first instruction in program order, and wherein the first instruction is prior to the second instruction in program order and wherein the second instruction includes a first operand;

a dependency checking circuit coupled to receive the operand requests and configured to detect a dependency of the second instruction on the first instruction for the first operand, wherein the dependency checking circuit is configured to convey a first indication of the dependency;

a storage location configured to store the second instruction at least until the second instruction is selected for execution, wherein the storage location is further configured to store the operand information corresponding to the second instruction, and wherein the storage location is further configured to store the first indication; and a control circuit coupled to the storage location and configured to cause the storage location to update the operand information corresponding to the first operand with a first tag of the first instruction responsive to the first indication.

22. The processor as recited in claim 21 wherein the first circuit comprises a future file.

23. The processor as recited in claim 21 further comprising a reorder buffer, wherein the reorder buffer is arranged as a plurality of lines of storage, and wherein a first line of storage is allocated to the first and second instructions, and wherein the tag comprises a line portion identifying the first line and a position portion identifying the position within the line.

24. The processor as recited in claim 23 wherein the control circuit is configured to generate the first tag using the line portion of a second tag assigned to the second instruction and the first indication identifying the position of the first instruction in the first line.

* * * * *